United States Patent [19]
Talmy et al.

[11] Patent Number: 5,571,759
[45] Date of Patent: Nov. 5, 1996

[54] CRB$_2$-NBB$_2$ CERAMICS MATERIALS

[75] Inventors: Inna G. Talmy, Silver Spring; Eric J. Wuchina, Wheaton; James A. Zaykoski, Beltsville; Mark M. Opeka, Laurel, all of Md.

[73] Assignee: The United States of America as represented by the Secretary of the Navy, Washington, D.C.

[21] Appl. No.: 551,253

[22] Filed: Oct. 31, 1995

[51] Int. Cl.$^6$ ................................................. C04B 35/58
[52] U.S. Cl. .................................... 501/96; 423/297
[58] Field of Search .............................. 501/96; 423/297

[56] References Cited

U.S. PATENT DOCUMENTS

| | | | |
|---|---|---|---|
| 4,592,882 | 6/1986 | Parrish | 423/297 |
| 4,983,340 | 1/1991 | Montgomery | 501/96 |
| 5,185,112 | 2/1993 | Saito et al. | 501/96 |

*Primary Examiner*—Karl Group
*Attorney, Agent, or Firm*—John L. Forrest; Roger D. Johnson

[57] ABSTRACT

Ceramic materials based on solid solutions of chromium diboride (CrB$_2$) and niobium diboride (NbB$_2$).

8 Claims, 2 Drawing Sheets

$CRB_2$-$NBB_2$ CERAMICS MATERIALS

BACKGROUND

This invention relates to ceramics and more particularly to ceramics based on metal borides.

Previous studies on diboride materials have focused primarily on group VI metal diborides. Ceramics based on zirconium diboride ($ZrB_2$) and Hafnium diboride ($HfB_2$) were developed through the 1960s by the U.S. Air Force for advanced hypersonic vehicle leading edges. While these materials are useful it would be desirable to produce new, improved ceramic materials.

SUMMARY OF THE INVENTION

An object of this invention is to provide a new ceramic material.

Another object of this invention is to provide a new ceramic material that is very hard.

A further object of this invention is to provide a new ceramic material that is resistant to oxidation.

These and other objects of this invention are achieved by providing a ceramic material that is based on a solid solution comprising from more than zero to less than 100 mole percent $CrB_2$ with the remainder in the solid solution being $NbB_2$.

BRIEF DESCRIPTION OF THE FIGURES

A more complete understanding of the invention and many of the attendant advantages thereto will be readily appreciated as the same becomes better understood by reference to the following detailed description when considered in connection with the accompanying figures wherein.

DESCRIPTION OF THE INVENTION

Figure 1:
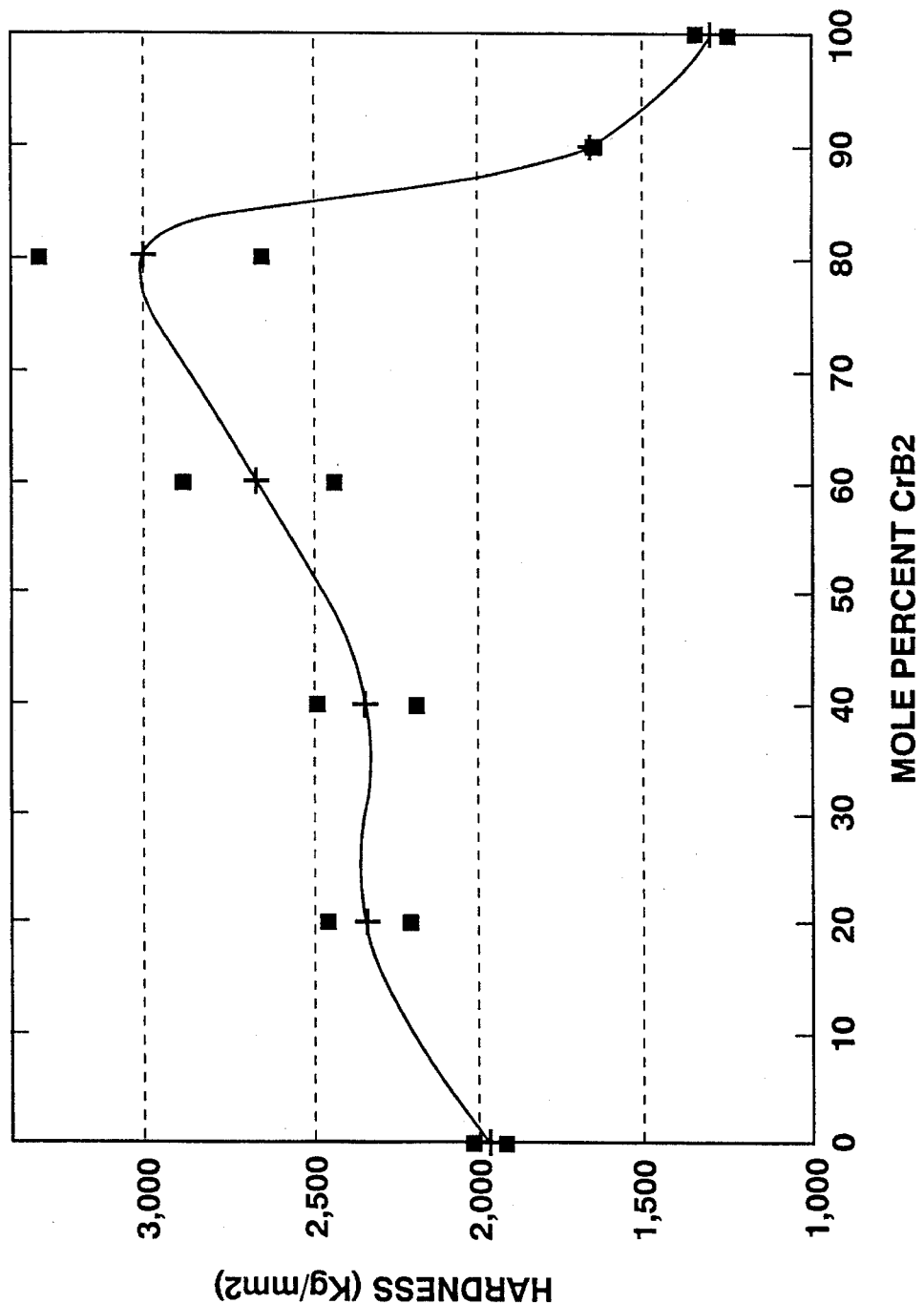
FIG. 1 is a plot of hardness versus composition for ceramic materials based on $CrB_2$-$NbB_2$ solid solutions.
Figure 2:
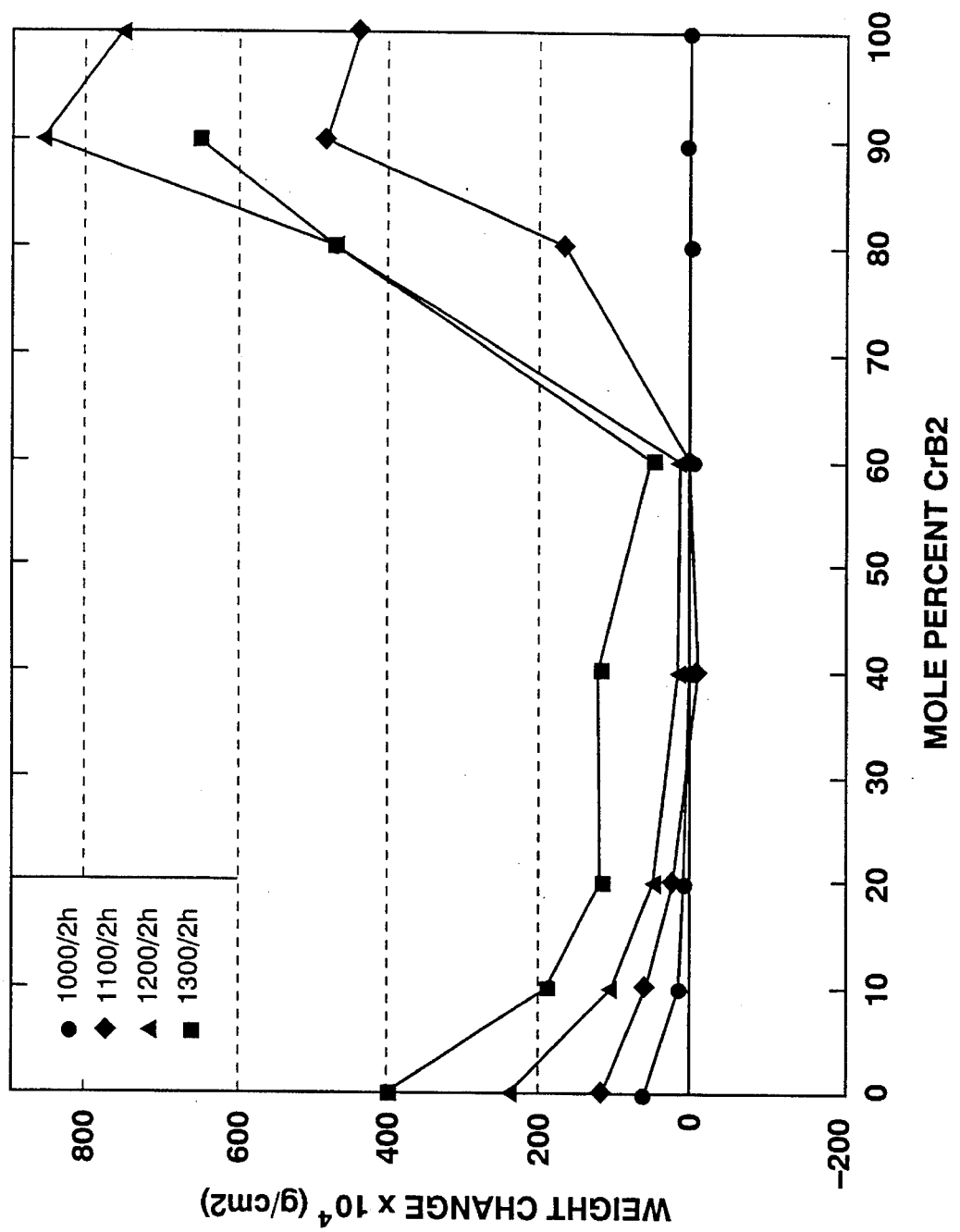
FIG. 2 is a plot of weight change due to oxidation versus composition for ceramic materials based on $CrB_2$-$NbB_2$ solid solutions.

The ceramic materials of this invention are based on solid solutions of chromium diboride ($CrB_2$) and niobium diboride ($NbB_2$). The $CrB_2$-$NbB_2$ solid solution comprises from more than zero to less than 100 mole percent $CrB_2$ with the remainder in the solid solution being $NbB_2$. FIG. 1 is a plot of the hardness of the ceramic material versus its composition (mole % $CrB_2$). FIG. 1 shows that the addition of even a small amount of $CrB_2$ to $NbB_2$ increases the hardness and similarly the addition of $NbB_2$ to $CrB_2$ increases the hardness of the ceramic material. For hardness, the ceramic material is based on a $CrB_2$-$NbB_2$ solid solution having a composition of preferably from about 20 to about 85, more preferably from 60 to 85, and still more preferably from 75 to 80 mole percent of $CrB_2$ with the remainder in the solid solution being $NbB_2$. FIG. 2 shows the change in weight due to oxidation in air in furnaces at 1000° C., 1100° C., 1200° C., and 1300° C. for various $CrB_2$-$NbB_2$ solid solution ceramic compositions. Samples which have significant changes in weight due to oxidation also have noticeable changes in appearance such as changes in color, size, shape, density, strength, etc. For applications where the ceramic material is not heated above 1000° C., oxidation will not be a problem if the $CrB_2$-$NbB_2$ solid solution ceramic material has a composition of from 10 to less than 100 mole percent $CrB_2$ with the remain in the solid solution being $NbB_2$. In that case the $CrB_2$-$NbB_2$ solid solution composition is selected for hardness. For oxidation resistance when the $CrB_2$-$NbB_2$ solid solution ceramic material is heated above 1000° C., a $CrB_2$-$NbB_2$ solid solution having a composition of preferably from about 15 to about 70 and more preferably from 20 to about 60 mole percent of $CrB_2$ with the remainder in the solid solution being $NbB_2$ is used. When the ceramic material is heated above 1000° C. during use, the preferred embodiment is a ceramic material based on a solid solution of about 60 mole percent $CrB_2$ with the remainder in the solution being $NbB_2$. This composition provides maximum oxidation resistance with good hardness. When the ceramic material is not heated above 1000° C. during use, the preferred embodiment is a ceramic material based on a solid solution of about 80 mole percent $CrB_2$ with the remainder in the solid solution being $NbB_2$. This composition provides maximum hardness.

The process of making the $CrB_2$-$NbB_2$ solid solution ceramic material begins with the preparation of an intimate mixture of $CrB_2$ and $NbB_2$ powders. Commercially available $CrB_2$ and $NbB_2$ powders having a particle size and purity suitable for ceramic processing are used. In the examples, $CrB_2$ powders (99.5% purity, −325 mesh) and $NbB_2$ powder (99.5% purity, −325 mesh) from CERAC INC. was used. The intimate mixture is formed by conventional means. In the examples, a slurry of the desire proportions of $CrB_2$ powder, $NbB_2$ powder, and a volatile organic solvent (methanol, acetone, etc.) was formed and thoroughly mix. The $CrB_2$/$NbB_2$ powder mixture was dried and passed through a 500 micron screen three times.

The intimate $CrB_2$/$NbB_2$ powder mixture is then converted into a $CrB_2$-$NbB_2$ solid solution ceramic body by hot pressing. For simple geometric shapes conventional die hot pressing techniques are used. More complex ceramic bodies can be prepared by conventional hot isostatic pressing (HIP). The hot pressing must be done in a noble gas (argon, helium, neon, etc.) atmosphere or in a vacuum.

Samples of $CrB_2$-$NbB_2$ solid solution ceramic materials which were prepared using a graphite die are listed in table 1. Table 1 gives the compositions of the intimate mixtures of $CrB_2$ and $NbB_2$ powders used, as well as the process temperature, pressure, and time for each composition.

TABLE 1

| COMPOSITION | | | | PROCESS CONDITIONS | | |
|---|---|---|---|---|---|---|
| Mole % | | Weight % | | Temperature | Pressure | Time |
| $NbB_2$ | $CrB_2$ | $NbB_2$ | $CrB_2$ | (°C.) | (MPa) | (min.) |
| 100 | 0 | 100 | 0 | 2100 | 20 | 30 |
| 95 | 5 | 96.76 | 3.27 | 2100 | 30 | 30 |
| 90 | 10 | 93.33 | 6.66 | 2000 | 30 | 30 |
| 80 | 20 | 86.15 | 13.84 | 2000 | 30 | 30 |
| 60 | 40 | 70.00 | 30.00 | 1900 | 30 | 30 |
| 40 | 60 | 50.91 | 49.09 | 1900 | 30 | 30 |
| 20 | 80 | 28.01 | 72.00 | 1900 | 30 | 30 |
| 10 | 90 | 14.74 | 85.35 | 1900 | 30 | 30 |
| 5 | 95 | 7.57 | 92.43 | 1900 | 30 | 30 |
| 0 | 100 | 0 | 100 | 1900 | 20 | 30 |

Thus, the $CrB_2$-$NbB_2$ solid solution ceramic materials can be prepare by hot die pressing the intimate $CrB_2$/$NbB_2$ powder mixture for 30 minutes at a pressure of 30 MPa and at a temperature of 2100° C. if the $CrB_2$ content is less than 5 mole percent, 2000° C. if the $CrB_2$ content is from 5 to less than 20 mole percent, or 1900° C. if the $CrB_2$ content is from 20 to less than 100 weight percent in the solid solution. Hot die pressing for 30 minutes at 2100° C. and 30 MPa should produce a good $CrB_2$-$NbB_2$ solid solution ceramic material for any composition. Again the hot pressing must be done in a noble gas (argon, helium, neon, etc.) or in a vacuum. The pressure used to prepare these ceramic materials can be varied. Pressures of from 10 MPa to 40 MPa (limited by the graphite die strength) were used to produce the $CrB_2$-$NbB_2$ solid solution ceramic materials.

The ceramic process temperature should preferably be from about 1900° C. to 2100° C. as illustrated by Table 1. The melting point (~2200° C.) of $CrB_2$ limits the upper end of the ceramic process temperature range. The process temperature should be at least 1900° C. in order to have a practical process time. On the other hand, as the temperature is decreased, the time required to form solid solutions increases exponentially. For example, the formation of continuous solid solutions at 1600°, 1500°, and 1400° C. was accomplished after 10, 72, and 228 hours of heat treatment, respectively, as compared to 30 minutes at 1900° C.

$CrB_2$-$NbB_2$ solid solution ceramic materials prepared by hot pressing using graphite die and the process conditions given in Table 1 were tested for hardness. The results are plotted in FIG. 1. Each cross (+) is an average of the hardness measurements for that composition. The squares above and below the average curve show the range of the test results for each composition. In the preferred compositional ranges, even the lowest hardness measurement exceeds the hardness of pure $NbB_2$ and of pure $CrB_2$. Moreover, over the entire solid solution compositional range the lowest hardness measurements exceed what can be expected from the rule of mixtures. Also the pattern of hardness versus composition is the same for the lowest and highest measurements (as well as the averages).

Vickers hardness tests were conducted using LECO V-100-C Series Vickers Macrohardness Tester to both determine hardness and estimate the fracture toughness of the materials. Indents were made at a 20 kg load for 15 seconds on fully dense samples which were polished through a 6 µm diamond finish. For comparison, the hardness was also measured at a 2 kg load. The hardness was calculated using the formula: $H=1.8544L/d^2$, where H is the hardness in $kg/mm^2$, L is the load in kg, and d is the diagonal in mm. Typically, hardness values are the average of at least five indentations.

The furnace oxidation experiments (see FIG. 2) showed very poor oxidation resistance of both $NbB_2$ and $CrB_2$ ceramics above 1000° C. FIG. 2 shows the weight change $\times 10^4$ ($g/cm^2$) for the $CrB_2$-$NbB_2$ solid solution ceramic materials of table 1 when heated at 1000° C. (small squares), 1100° C. (crosses, +), 1200° C. (stars, *), and 1300° C. (large solid squares) in air for 2 hours. The $NbB_2$ samples had a thick, porous, non-adherent coating, containing $Nb_3BO_9$ and small amount of $B_2O_3$, which could not provide effective oxidation protection. The thickness of the oxidation product increased with increasing temperature and/or holding time. The weight change data probably represent both a gain in weight from the formation of niobium oxide and $B_2O_3$ and a loss in weight due to the evaporation of residual $B_2O_3$ left after reaction between the oxides. In this case, the evaporation of $B_2O_3$ probably controls the overall oxidation process of $NbB_2$ ceramics.

The oxidized $CrB_2$ samples were coated with well adherent layer of $Cr_2O_3$ and $CrBO_3$ which protected the sample even after 100 hours hold at 1000° C. At higher temperature, gradual softening and melting of $CrBO_3$ with simultaneous formation of gaseous $B_2O_3$ resulted in the foaming of the oxidation product and loss of protecting capabilities. Ceramics of intermediate compositions showed a dramatic improvement in oxidation behavior compared to the end members. Compositions containing between 20 and 60% $CrB_2$ showed practically no oxidation at 1200° C. The samples were coated with very thin adherent layer consisting of $Nb_3BO_9$ and $B_2O_3$ bonded with the high melting point (1700° C.) $CrNbO_4$.

Obviously numerous modifications and variations of the present invention are possible in light of the above teachings. It is therefore to be understood that within the scope of the appended claims the invention may be practiced otherwise than as specifically described herein.

What is claimed is:

1. A material which is a ceramic based on a solid solution comprising from more than zero to less than 100 mole percent $CrB_2$ with $NbB_2$ being the remainder in the solid solution.

2. The material of claim 1 which is a ceramic based on a solid solution comprising from about 20 to about 85 mole percent of $CrB_2$ with $NbB_2$ being the remainder in the solid solution.

3. The material of claim 2 which is a ceramic based on a solid solution comprising from 60 to 85 mole percent $CrB_2$ with $NbB_2$ being the remainder in the solid solution.

4. The material of claim 3 which is a ceramic based on a solid solution comprising from 75 to 80 mole percent of $CrB_2$ with $NbB_2$ being the remainder in the solid solution.

5. The material of claim 1 which is a ceramic based on a solid solution comprising about 80 mole percent $CrB_2$ with $NbB_2$ being the remainder in the solid solution.

6. The material of claim 1 which is a ceramic based on a solid solution comprising from about 15 to about 70 mole percent $CrB_2$ with $NbB_2$ being the remainder in the solid solution.

7. The material of claim 6 which is a ceramic based on a solid solution comprising from 20 to 60 mole percent $CrB_2$ with $NbB_2$ being the remainder in the solid solution.

8. The material of claim 1 which is a ceramic based on a solid solution comprising about 60 mole percent $CrB_2$ with $NbB_2$ being the remainder in the solid solution.

* * * * *